(12) United States Patent
Collison

(10) Patent No.: US 9,908,684 B2
(45) Date of Patent: *Mar. 6, 2018

(54) INSULATED SHIPPING SYSTEM

(71) Applicant: Chad A. Collison, Pierce, NE (US)

(72) Inventor: Chad A. Collison, Pierce, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,387

(22) Filed: Feb. 22, 2017

(65) Prior Publication Data

US 2017/0225870 A1    Aug. 10, 2017

Related U.S. Application Data

(63) Continuation of application No. 14/266,156, filed on Apr. 30, 2014, now Pat. No. 9,611,067.

(60) Provisional application No. 61/817,369, filed on Apr. 30, 2013.

(51) Int. Cl.
| | |
|---|---|
| *B65D 81/133* | (2006.01) |
| *B65D 81/24* | (2006.01) |
| *B65D 5/49* | (2006.01) |
| *B65D 81/127* | (2006.01) |
| *B65D 81/38* | (2006.01) |

(52) U.S. Cl.
CPC ..... *B65D 81/3858* (2013.01); *B65D 5/48038* (2013.01); *B65D 81/127* (2013.01)

(58) Field of Classification Search
CPC .............. B65F 81/3858; B65F 5/48038; B65F 81/127; Y10T 428/1307; B65D 81/3858; B65D 5/48038; B65D 81/127

USPC ................... 206/521–594, 427; 428/95, 34.3
See application file for complete search history.

(56) References Cited

U.S. PATENT DOCUMENTS

| | | |
|---|---|---|
| 1,868,996 A | 7/1932 | Paul |
| 3,222,843 A | 12/1965 | Schneider |
| 6,875,486 B2 | 4/2005 | Miller |
| 6,910,582 B2 | 6/2005 | Lantz |
| 7,094,192 B2 | 8/2006 | Schoenberger et al. |
| 7,229,677 B2 | 6/2007 | Miller |
| 8,763,886 B2 * | 7/2014 | Hall ..................... B65D 5/0227 220/592.25 |
| 2009/0193765 A1 | 8/2009 | Lantz |
| 2009/0283578 A1 | 11/2009 | Miller |
| 2010/0072105 A1 | 3/2010 | Glaser |
| 2011/0114513 A1 | 5/2011 | Miller |
| 2011/0311758 A1 | 12/2011 | Burns |
| 2012/0145568 A1 | 6/2012 | Collison |
| 2014/0319018 A1 | 10/2014 | Collison |

* cited by examiner

*Primary Examiner* — Chun Cheung

(74) *Attorney, Agent, or Firm* — Harness, Dickey & Pierce, P.L.C.

(57) ABSTRACT

A shipping container has an inner insulative sleeve having an outer, longitudinally extending, polymer film with lateral edges folded on itself to form a pocket having an opening and sealable by a flap. An assembly has an inner, longitudinally extending, biodegradable film having lateral edges and a longitudinal extending pad composed of textile cuttings and microbial and super-absorbent powders. The inner film extends longitudinally around the pad and is attached to the pad.

18 Claims, 6 Drawing Sheets

INSULATED SHIPPING SYSTEM

CROSS-REFERENCE TO RELATED APPLICATIONS

This application is a continuation of U.S. patent application Ser. No. 14/266,156, filed Apr. 30, 2014, which claims the benefit of U.S. Provisional Application No. 61/817,369, filed Apr. 30, 2013. The entire disclosures of the above applications are incorporated herein by reference.

FIELD

The present disclosure relates to an insulative packaging system and, more particularly, to an insulative packaging system utilizing a chopped fiber insulative pad incorporating antimicrobial and absorbtive powders.

BACKGROUND

This section provides background information related to the present disclosure which is not necessarily prior art.

The current technology provides paper mailers, lined with plastic bubble-wrap, or more expensive foam, or foam-lined boxes. These products are used primarily for shipping sensitive or fragile items, but suffer from the fact that they have extremely limited cushioning, no absorption properties, no antimicrobial properties, and practically no temperature-control value.

Foam, or foam-lined boxes are also used for shipping temperature-sensitive products such as medical samples, pharmaceuticals, chocolates, etc. These current products, in addition to being dramatically more expensive to purchase, warehouse, and ship (in-bound and outbound freight), are also more labor intensive, less user-and-environmentally friendly, and provide very limited protection during transit. Often these shipping containers utilize a significant amount of dry ice to maintain key low temperatures to prevent spoilage.

SUMMARY

This section provides a general summary of the disclosure, and is not a comprehensive disclosure of its full scope or all of its features.

An insulative packing system for bottles is disclosed. The material contains a plurality of corrugated members which interleave to form a plurality of bottle holding cavities. polymer film having an interior surface and lateral edges folded on itself to form a pocket having an opening and sealable by a flap. A textile pad having chopped fibers selected from the group polyester, nylon, acrylic, cotton, polypropylene, denim and combinations thereof is coupled to an interior surface being attached to the pad. The textile pad has powder antimicrobials while the polymer film has biodegradable enhancers added therein.

An insulative packaging system has a shipping container, a three layered polymer film laminate having an interior surface and lateral edges folded on itself to form a pocket having an opening and sealable by a flap, and a textile pad. The textile pad is disposed within the container and the polymer film and is formed of chopped fibers selected from the group polyester, nylon, acrylic, cotton, polypropylene, denim and combinations thereof. The textile pad further has microbial and super-absorbent powders disposed adjacent to an exterior surface of the textile paid or within.

Other and further objects of the present invention will become apparent from the following detailed description of the invention when taken in conjunction with the appended drawings.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
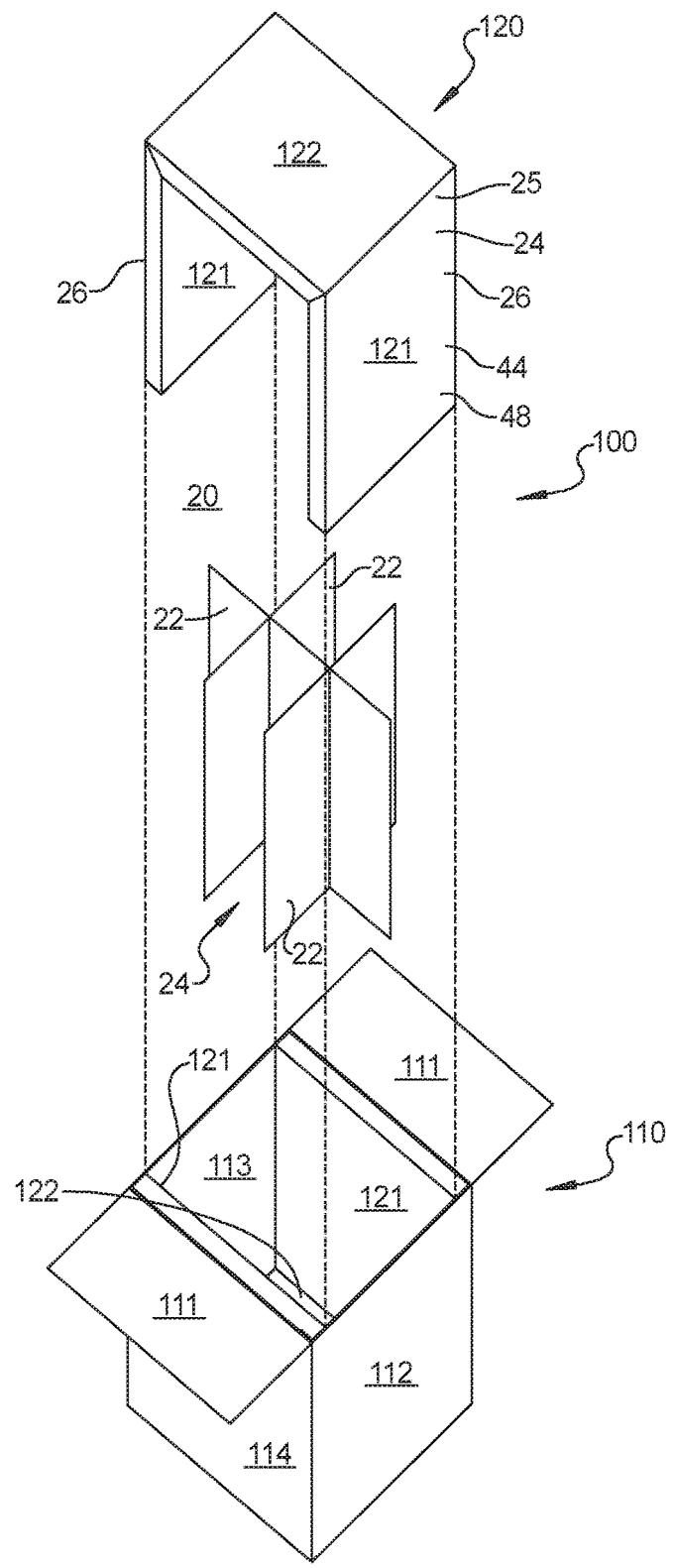
FIG. 1 is a diagrammatic front perspective view showing a mailer according to the invention lying flat.
Figure 2:
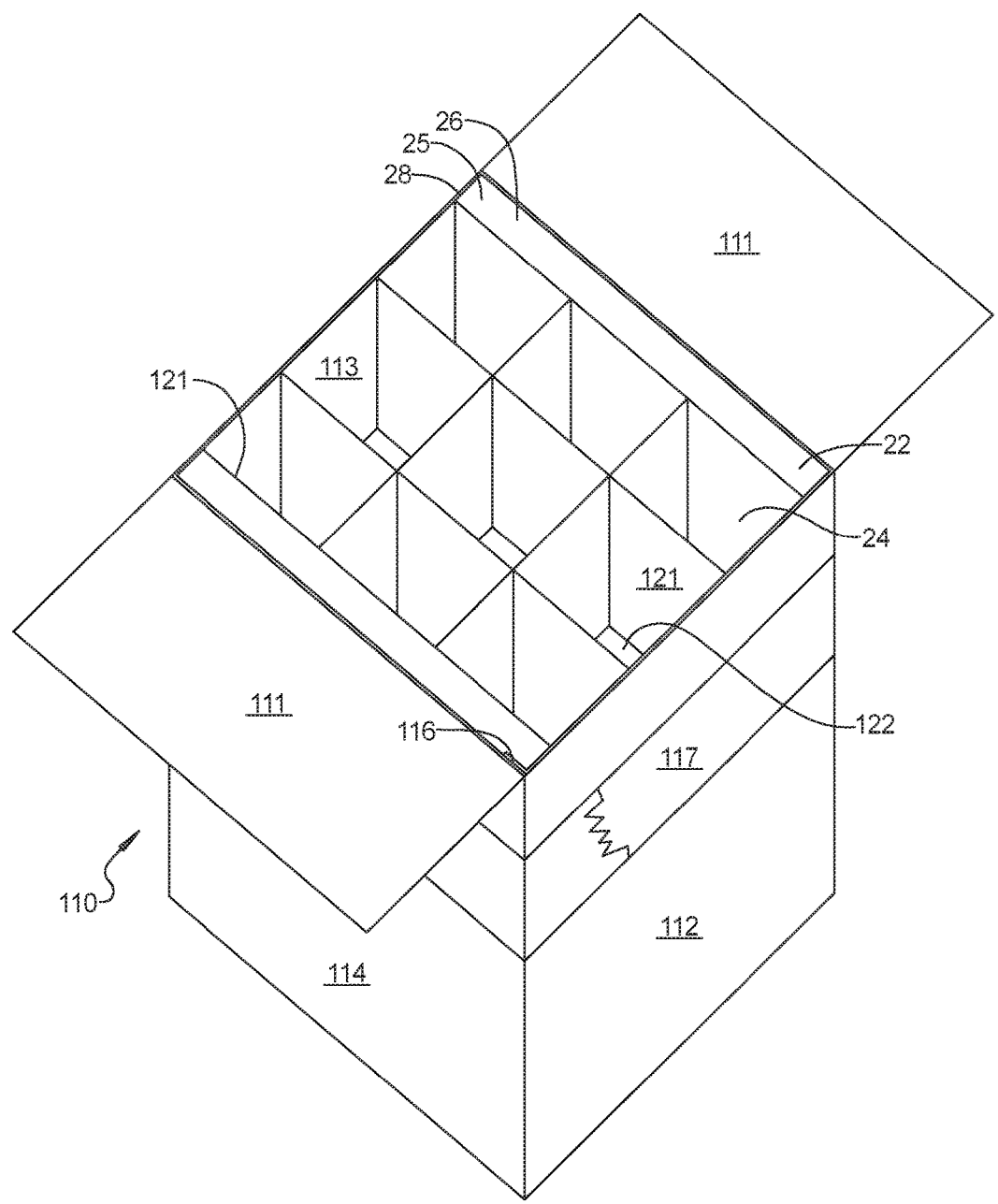
FIG. 2 is a diagrammatic rear perspective view showing the mailer of FIG. 1 lying flat.

Example embodiments will now be described more fully with reference to the accompanying drawings.

Referring now to the drawings, the mailer is shown in FIGS. 1 to 4. The mailer or system can be composed of materials that are 100% biodegradable. The outer surface of the mailer 10 can consist of a non-petroleum based, biodegradable film or paper 12 that is also waterproof. Optionally, the film 12 extends laterally so its lateral edges or margins 20 can be heat sealed together. At the bottom of the mailer the film 12 is folded at 22. At the top of the mailer the front top edge 28 terminates at the mailer opening 24, and the back continues upwardly to form flap 26 to enable the mailer 10 to be sealed by folding the flap 26 over the front of the mailer closing off the opening 24. The flap 26 has a lateral stripe of adhesive 30 covered with a removable protecting paper 32.

The inner surface of the mailer 10 can be a non-petroleum based, biodegradable film or paper (substrate) 14 that is permeable. Sandwiched between the inner biodegradable film or paper (substrate) 14 and the outer film 12, and sealed on all sides, is a proprietary, biodegradable pad 16 made from re-cycled, purified, ground-up material to which super absorbent powders (for the absorption of spills), and antimicrobial powders (for the prevention of contamination in case of rupture for such products as blood or vaccines, etc.) have been added during manufacture. The antimicrobials are programmed to expire, after a pre-selected desired length of time, to allow for the eventual, natural, degradation/biodegradability of the mailer. The outer surface of the pad 16 is encompassed within the water-proof, biodegradable film or paper 12, sealed on two (or three) sides with film 14, which extends laterally coextensive with film 12. The film 14 is double-sealed with pressure-sensitive, biodegradable tape 18 (covered with a protective strip 34, at the top, for safety and to prevent tampering). Film 14 does not surround the pad 16 completely, but the end portions 40 extend around the pad 16 sufficiently to enable the end portions 40 to be sealed with the film 12, as indicated at 44.

Figure 3:
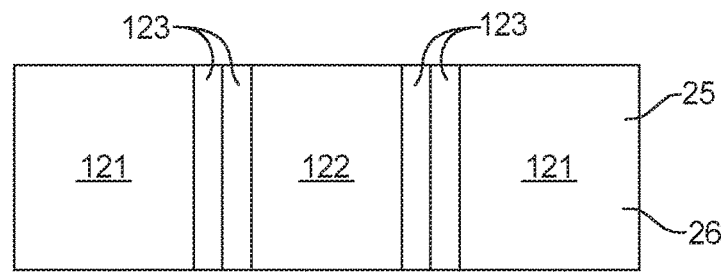
FIG. 3 is a longitudinal sectional view showing the mailer prior to folding and heat sealing.
Figure 4:
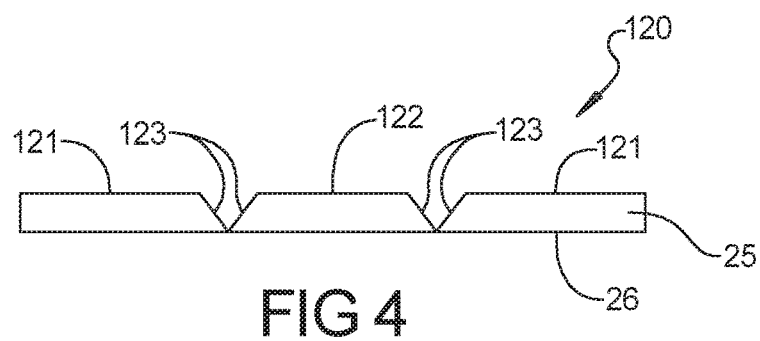
FIG. 4 is a partial view showing an upper part of the mailer shown in FIG. 3 (the left side as shown), prior to folding and heat sealing, partly broken away to reveal the component parts.

As shown in FIGS. 3 and 4, the film 14 can be stitched together with the pad 16 in the following manner. A row of smaller stitches 50 extend from top to bottom of the mailer 10 along each side thereof juxtaposed adjacent to the lateral edges 52 of pad 16. Spaced slightly inwardly of stitches 50, is a second row of larger stitches 56 that encompass the pad 16 and the film 14 on the inside of the pad 16 and include the portions 42 on the outside of the pad 16. The second rows of stitches only extend longitudinally from the top of the mailer downwardly and terminate with the portions 42. Apart from the stitching and heat sealing of the film 14 to film 12, pad 16 is not attached to film 12. The laid-out mailer shown in FIG. 3 is folded along the dotted line 60 to achieve the finished mailer in the manner noted above. Optionally, the pocket can be formed using independent sheets which are chemically or thermally bonded.

The pad 16, as duly noted, can be made from re-cycled, purified, ground-up material to which super absorbent powders (for the absorption of spills), and antimicrobial powders (for the prevention of contamination in case of rupture for such products as blood or vaccines, etc.) have been added during manufacture. The antimicrobials are programmed to expire, after a pre-selected desired length of time, to allow for the eventual, natural, degradation-biodegradability of the mailer.

As evident from the above description, the pad 16 is covered by the film 14 on the inside with film 14 extending laterally beyond the pad 16 to lie coextensive with the marginal edges of the film 12 so all marginal edges can be heat sealed together. Film 14 extends around the longitudinal extremities of the pad 16 so that the end portions 40 of the film 14 lie between the pad 16 and the outer film 12 when the pad 16 is located in the mailer 10. These portions 40 enable the film 14 to be heat sealed together with the film 12 around the mailer opening 24, thereby entrapping the pad 16. The portion of the opening 24 that lies with the flap 26 has pressure-sensitive, biodegradable tape 18 (covered with a protective strip 34) in order to seal the top edges of the inner film 14 together before the flap 26 is sealed to the front of the mailer 10.

The film is preferably a biodegradable polymer as defined by ASTM 1991, and is preferably biodegradable in 9 months to 5 years either anaerobically and aerobically. The film can be manufactured as a 3-layer construction. In this regard, each layer can be manufactured with a biodegradable additive from ECM Biofilms, Inc. of Painsville, Ohio 44077. Optionally, the inner and outer layer can be colored with colors such as white or silver. The inside layer can be laminated to the pad material using an adhesive or thermal bonding. The layered structure can be perforated and have an inner nylon core and low-density polyethylene skin. Optionally, this laminate structure can be formed using a molten material force fed through a die and subsequently cooled.

The insulative batt is manufactured from any of a wide variety of textile compositions comprising, for example, polyester, nylon, acrylic, cotton, polypropylene, denim etc., or combinations thereof, including both natural and man-made fibers. Randomly distributed textile and binder fibers having lengths between $1/16$ inch to 1.5 inches and a denier of between 5 and 12 are used to form a textile batt, which is processed to form the insulative pad.

In one embodiment, two textile pads are bonded to a biodegradable polymer layer to form the textile insulative construction. The resulting pads may be used as an insulative layer within a shipping container that can be formed of a polymer, paper, or cardboard material. There are several ways to make the textile batt. In the first, the fiber batt can contain binder fibers. The fiber batt is heated in an oven and compressed to form an insulative pad. Optionally, the insulative pad can be formed using needle setting technology.

Optionally, several layers of enveloped textile pad can be used to form the construction. Each textile pad within the system may be of equal thickness, or may be of unequal thickness. It is envisioned the pad can have a thickness of about $1/16$ of an inch or greater. The starting insulative pad may be split longitudinally to provide two, three or more partial thickness batts. Optionally, the fibers can include thermoplastic binder fibers and reinforcement fibers are laid randomly yet consistently in x-y-z axes. The reinforcement fibers are generally bound together by heating the binder fibers above their glass transition temperature. Typically, less than about 20% by weight binder fiber is used, and preferably about 15% binder fiber is used to form the insulative pad.

Thermoplastic binder fibers are provided having a weight of less than 0.2 pounds per square foot and, more particularly, preferably about 0.1875 pounds per square foot. The remaining reinforcement fiber is greater than 0.8 pounds per square foot, and preferably 1.0625 pounds per square foot. The binder fibers are preferably a mixture of thermoplastic polymers which consist of polyethylene/polyester or polypropylene/polyester or combinations thereof.

The insulative pad is formed by heating the textile batt in the oven to a temperature greater than about 350° F. and, more preferably, to a temperature of about 362° F. Such heating causes the binder fibers to melt and couple to the non-binder fibers, thus causing fibers to adhere to each other and solidify during cooling. Upon cooling, the binder fibers solidify and function to couple the non-binder reinforcement fibers together as well as function as reinforcement themselves.

The insulative textile batt is compressed to form the insulative pad so it has a density of greater than about 10 pounds per cubic foot. For systems, the insulative pad preferably has a density of greater than about 10 pounds per cubic foot and, more preferably, about 13.3 pounds per cubic foot with a thickness of about $1/8$ inch.

The insulating properties of the material are tested under ASTME90-97, ASTME413-87. The insulative pad preferably has a compression resistance at 25% of the original thickness of greater than about 20 psi and preferably about 23.2 psi, at 30% of greater than about 35.0 psi and preferably about 37.0 psi, and at 50% of greater than about 180 psi and preferably about 219 psi. Additionally, the compression set at a compression of 25% of the original thickness is less than 20%, and preferably about 18.8%, and the tensile strength is between about 60 and 80 pounds and, most preferably, about 78.4 pounds.

Phase-change materials (refrigerants/gel packs) used in the mailer can also biodegradable, making the entire shipping system cost-effective, environmentally-friendly, and socially-responsible.

The insulative properties of the mailer are roughly equivalent to one-half inch of foam, thus, allowing for the savings of second-day shipping as opposed to the cost of overnight priority freight/delivery charges as is required with current mailer technology.

The textile pad can serves six purposes: 1) insulation; 2) padding/cushioning; 3) absorption; 4) antimicrobial action; 5) biodegradability and; 6) cost efficiency (in terms of initial cost as opposed to a foam-lined box, set-up/fulfillment labor expenses, storage space, with attendant charges, and in-bound and out-bound freight charges).

The insulation properties of the mailer are roughly equivalent to one-half inch of foam, thus allowing for the savings of second-day shipping as opposed to the cost of overnight priority freight/delivery charges as is required with current mailer technology.

A specific example of a mailer according to the present invention is one that is 14.5 inches long, 10 inches wide, and has a 4.5 inch flap. The top opening is about 8.5 inches across and can be opened to about 5 inches, thereby facilitating loading.

Examples of the materials used for the mailer are as follows. Tri-extruded degradable sheeting can be used as a film. The film is manufactured as 37" lay flat at 0.004 inches. Grass green, opaque tri-extruded degradable sheeting can be used for film 14. The sheeting is manufactured with a degradable additive in all layers. The film manufactured is 12" lay flat at 0.0015 inches. For the film 12, a white opaque outside/silver-color inside tri-extruded degradable sheeting can be used. The sheeting is manufactured with a degradable additive in all layers. The film is manufactured as 12" lay flat at 0.004 inches. The films are obtainable commercially from a variety of suppliers.

An example of the sealing tape 18 is BP-1052 SIS block co-polymer rubber, obtainable from DarTape Technologies Corporation. Biodegradable materials are commercially available from ECM Biofilms, Inc., Painesville, Ohio. Incorporation of at least 1% of the ECM Masterbatch pellets will assure biodegradation. Antimicrobial materials useable are Lurol AM-7 obtainable from Goulston Technologies, Inc. of Monroe, N.C. The pad 16 was made using new textile clippings mixed with commercially available antimicrobial and super-absorbent powders (such as carboxymethylcellulose), and then processed through a web forming operation to produce a pad or batten about 15 mm or 0.6 inches thick. Film 12 can be from about 2 mils thick to about 6 mils thick, and preferably about 4 mils thick. Film 14 can be from about 0.5 mils thick to about 5 mils thick, and preferably about 3 mils thick. Pad 16 can be from about 5 mm thick to about 25 mm thick, and preferably about 15 mm thick.

Optionally, the absorbent material can be incorporated into the batting material prior to the binding of the fibers. Optionally, the absorbent material can be sodium polyacrylate in the form of a white powder. The sodium polyacrylate can have a pH of 5.5-6.5, a melting point of >390° F., and a specific gravity of 0.4-0.7 g/ml.

Example embodiments are provided so that this disclosure will be thorough, and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

Figure 5:
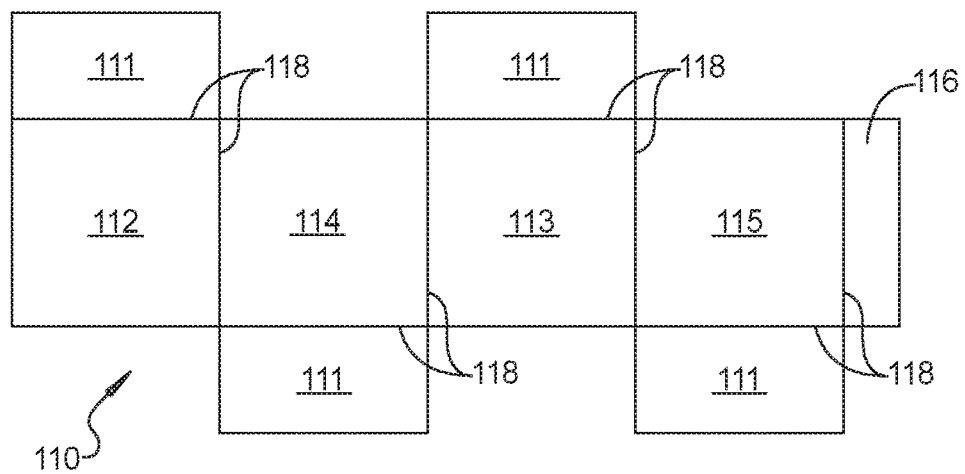
FIG. 5 is a diagrammatic top view of a box in a flat, unfolded position.

FIG. 5 shows a sheet that can be folded into a box 110. The sheet includes a row of four rectangular segments: front 112, right 114, back 113, and left 115. Flaps 111, which will form the top when folded, extend from a top edge of the row of segments 112, 114, 113, and 115. Flaps 111, which will form the bottom when folded, extend from a bottom edge of the row of segments 112, 114, 113, and 115. A tab 116 is included on one edge and is used during assembly of the box 110 from the sheet.

Figure 6:
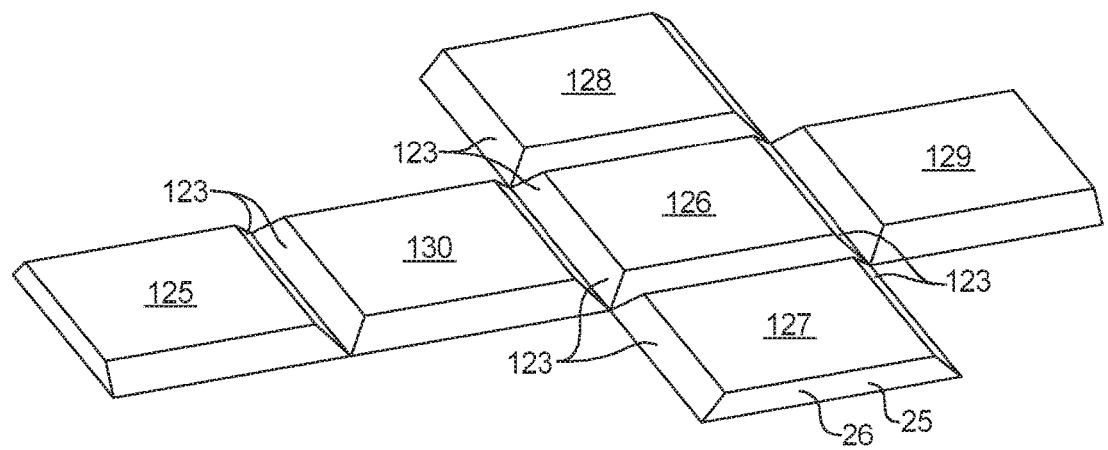
FIG. 6 is a diagrammatic side view of a three-segment insert according to the invention.
Figure 7:
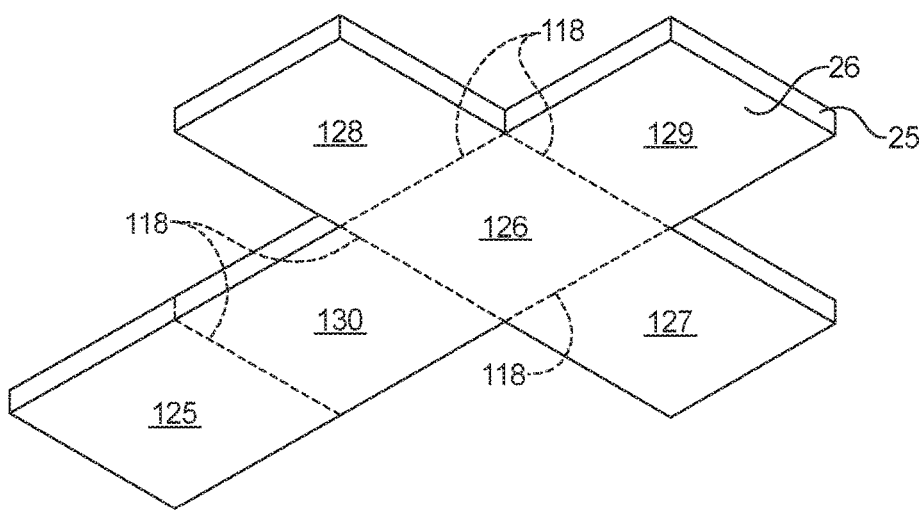
FIG. 7 is a top side view of the three-segment insert shown in FIG. 6.

FIGS. 6-7 show an embodiment of a panel of stiffened flocked material in the form of a three-segment insert 120. The three-segment insert 120 is made from the stiffened flocked material described previously. The three-segment insert 120 includes three panels 121, 122, and 121 configured in a row. Each segment 121 or 122 is configured to overlay a respective inner surface of the box 110. A miter joint 123 is formed between each segment 121, 122, and 121.

Figure 8:
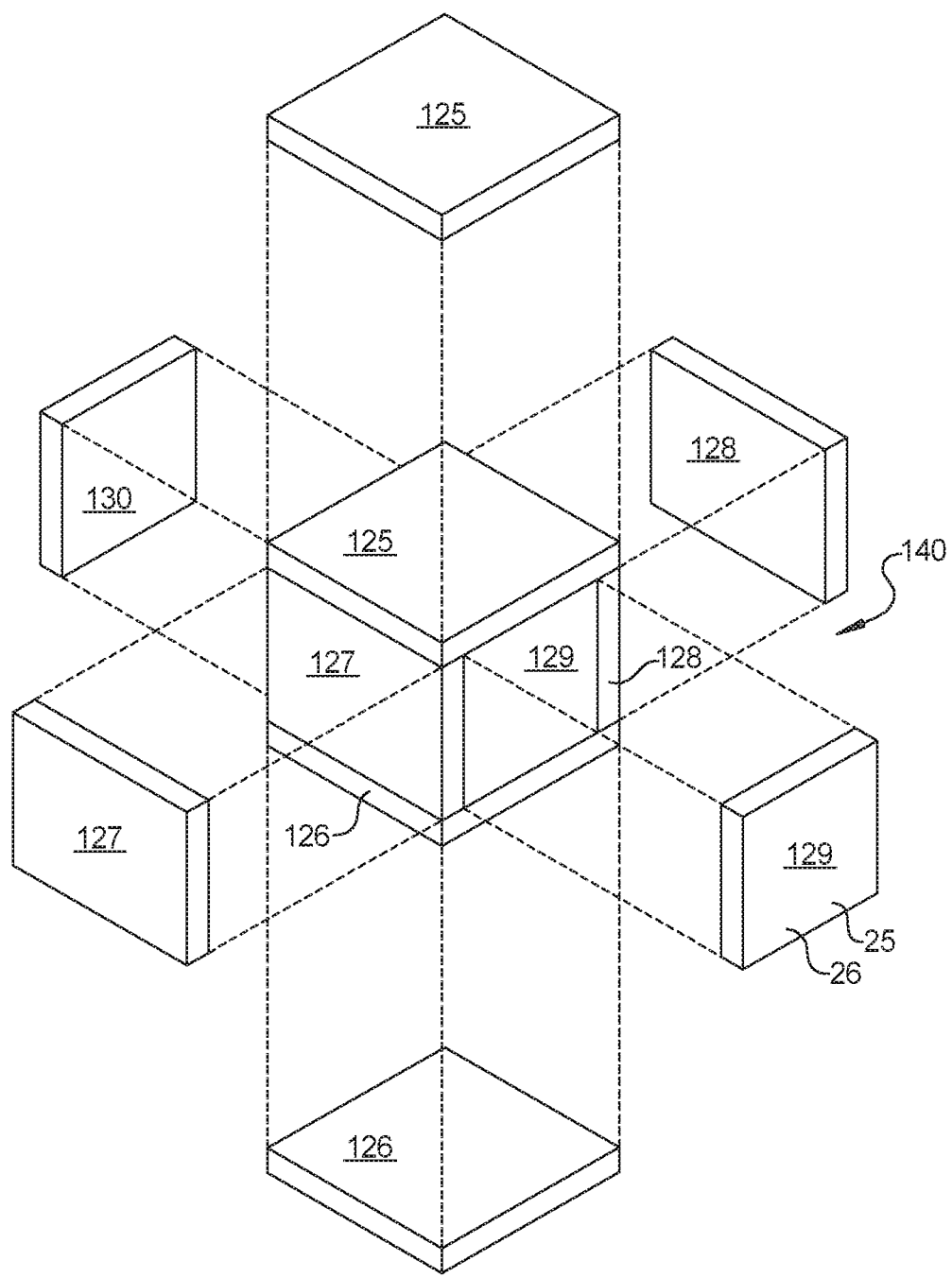
FIG. 8 is a perspective exploded view of a container with a box in the folded position with two three-segment inserts in a folded U-shape.
Figure 9:
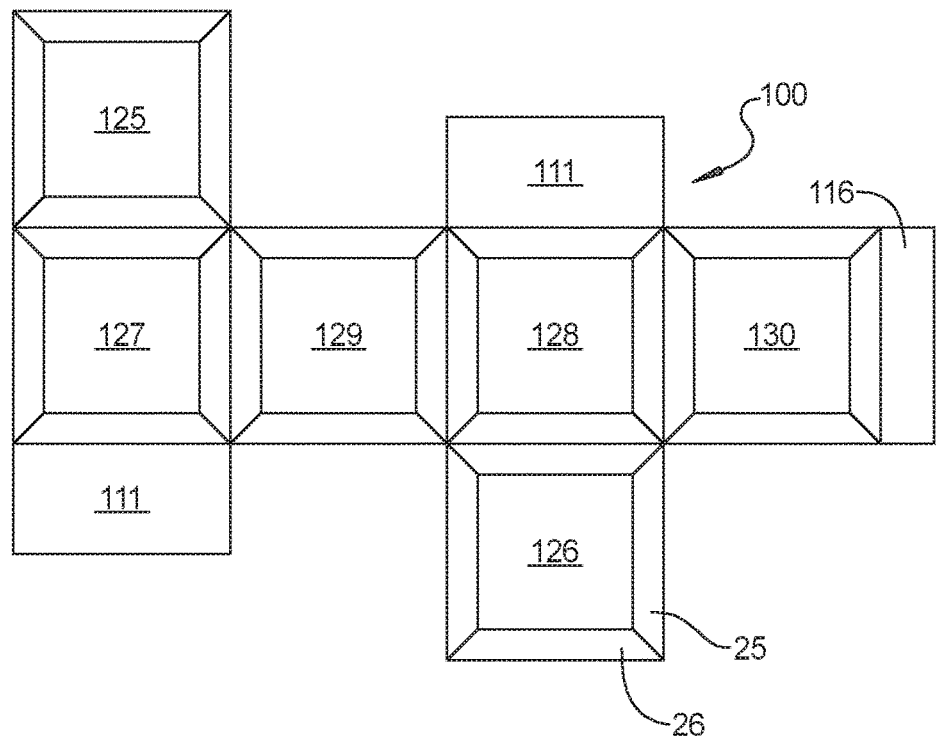
FIG. 9 is a perspective view of the container shown in FIG. 8 with a first of the two three-segment inserts inserted within the box.

As shown in FIGS. 8-9, two three-segment inserts 120 can be used with a box 110 to form a container 100. First, the box 110 is assembled. Tape 117 can be added around the box 110 to secure the box 110 in its folded shape. Next, a three-segment insert 120 is folded from its unfolded flat form shown in FIGS. 6-7 into a folded U-shaped form shown in FIG. 8. As shown in FIG. 9, a first folded three-segment insert 120 is inserted into the box 110. The first leg 121 overlies the right of the box 110. The base 122 overlies the bottom of the box 110. The second leg 121 overlies the left of the box 110. The U-shape member is placed with the base 122 on the bottom of the box 110 to allow a second U-shaped member to be inserted. Next, as shown in FIG. 8, a second three-segment insert 120 is folded into a U-shape and inserted into the box 110. A first leg 121 of the second insert 120 overlies a back 113 of the box 110. A top 122 of the second insert 120 overlies a top (i.e., folded flaps 111) of the box 110. When the two U-shaped members 120 are inserted within the box 110, an insulated container is formed. The walls of the U-shaped members 120 are sized to contact each other to prevent air from being able to penetrate the insulated layer.

Figure 10:
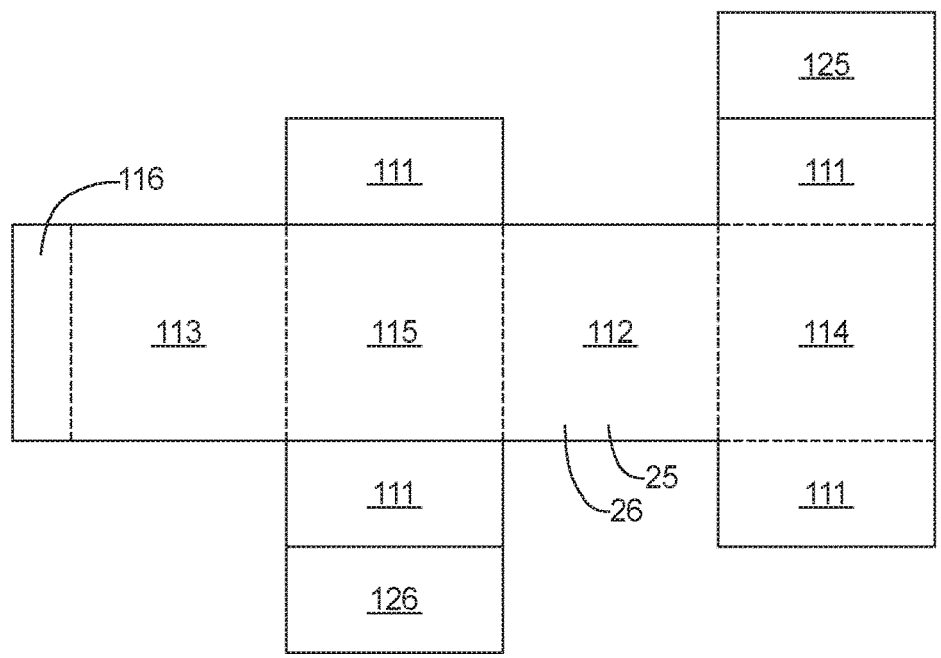
FIG. 10 is a perspective view of a cross-shaped six-panel insert with mitered joints.

In the figures, two cross-shaped embodiments, which are referred to as six-panel inserts 124, of panels of stiffened flocked material. The panels take the form of four panels 125, 130, 126, 129 aligned in a column and a row of three panels 126, 127, and 128 (i.e., two laterally opposed panels 127 and 128 extending from the top and bottom edges of the second panel 126 in the column). In the embodiment shown in FIG. 10, the panels 125-130 have miter joints 123 between them. In the embodiment, the panels 125-130 have scores 130 between them to assist in folding.

The embodiment shown in the figures can be shipped flat (as shown in the figures) to the user. Then, the user can fold the six-panel inserts 124 into a box shape. The folded six-panel insert 124 is placed within a box 110. The size of the panels 125-130 are configured to overlap corresponding panels 111-115 of the box 110.

In the figures, a six-panel insert 140. The six-panel insert is made from six separate panels 125-130. The panels 125-130 correspond to the faces 111-115 of a box 110. The panels 125-130 are inserted within the box and overly the interior of the faces 111-115. The panels 125-130 contact each other to form an insulated layer and compartment within the box 110.

In the figures, an embodiment of a container 100 that ships to the user flat. The box in the flat condition is like the box 110 shown in FIG. 5. Panels 125-130 are formed to complement the sides of the box 110. The panels 125-130 have mitered joints. Panels 125-130 are adhered to the faces 111-115 of the box 110. Glue is an example of a suitable adhesive to adhere the panels to the box. When the box 110 is folded, the panels 125-130 move with the box 110 into engagement with each other to form an insulated inner layer within the box 110. The inner layer is air-tight.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the invention has been described in terms of preferred embodiments, changes can be made which do not depart from the inventive concept. Such changes are deemed to fall within the purview of the appended claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An insulative packing construction comprising:
   a shipping container having inner surfaces defining an internal shipping container cavity;
   a plurality of interlinked polymer film envelopes disposed within the internal shipping container cavity and in contact with at least one of the inner surfaces, each of the plurality of polymer film envelopes defining an interior insulation cavity having an interior surface; and
   a plurality of textile pads comprising chopped fibers selected from the group consisting of polyester, nylon, acrylic, cotton, polypropylene, denim and combinations thereof, each of said textile pads being disposed within the interior insulation cavity of one of the plurality of polymer film, wherein the textile pad has a compression resistance at a compression of 25% of the original thickness of greater than about 20 psi and the textile pad has a compression resistance at 50% of the original thickness of greater than about 180 psi.

2. The construction according to claim 1 wherein the polymer film is perforated.

3. The construction according to claim 1 wherein the textile pad is unattached to an outer film surface.

4. The construction according to claim 1 wherein the textile pad is from about 5 mm thick to about 25 mm thick.

5. The construction according to claim 1 wherein the textile pad is about 15 mm thick.

6. The construction according to claim 1 wherein the polymer film is from about 2 mils thick to about 6 mils thick.

7. The construction according to claim 6 wherein the polymer film is about 4 mils thick.

8. The construction according to claim 1 wherein the polymer film is from about 0.5 mils thick to about 5 mils thick.

9. The construction according to claim 8 wherein the polymer film is about 3 mils thick.

10. The construction according to claim 1 wherein the textile pad consists of a fibrous web layer of interlocked reinforcement fibers distributed substantially randomly in a first plane.

11. The construction according to claim 1 wherein the textile pad has a density of greater than about 10 pounds per cubic foot.

12. The construction according to claim 1 wherein the textile pad is about 3/32 inch thick.

13. The construction according to claim 1 wherein the textile pad has a density of about 18.9 pounds per cubic foot.

14. An insulative packaging system comprising:
    a container having inner surfaces defining an internal shipping cavity;
    a polymer tube defining a pocket;

a textile pad comprising chopped fibers selected from the group consisting of polyester, nylon, acrylic, cotton, polypropylene, denim and combinations thereof, the textile pad further comprising microbial and superabsorbent powders, the textile pad having a compression resistance at a compression of 25% of the original thickness of greater than about 20 psi and the textile pad has a compression resistance at 50% of the original thickness of greater than about 180 psi, the textile pad being disposed within the pocket.

15. The insulative packing system according to claim 14 wherein the polymer film is perforated.

16. The insulative packing system according to claim 14 wherein the textile pad comprises sodium polyacrylate having a pH of between 5.5-6.5, a melting point of greater than 390° F., and a specific gravity of between 0.4-0.7 g/ml.

17. The insulative packing system according to claim 14 wherein the textile pad is from about 5 mm thick to about 25 mm thick.

18. The insulative packing system according to claim 16 wherein the textile pad is about 15 mm thick.

* * * * *